United States Patent
Knopf

(10) Patent No.: US 10,760,645 B2
(45) Date of Patent: Sep. 1, 2020

(54) ROTARY VISCOUS VIBRATION DAMPER OR ROTARY VISCOUS VIBRATION ABSORBER

(71) Applicant: Hasse & Wrede GmbH, Berlin (DE)

(72) Inventor: Florian Knopf, Berlin (DE)

(73) Assignee: Hasse & Wrede GmbH, Berlin (DE)

( * ) Notice: Subject to any disclaimer, the term of this patent is extended or adjusted under 35 U.S.C. 154(b) by 656 days.

(21) Appl. No.: 14/879,770

(22) Filed: Oct. 9, 2015

(65) Prior Publication Data

US 2016/0033004 A1 Feb. 4, 2016

Related U.S. Application Data

(63) Continuation of application No. PCT/EP2014/057437, filed on Apr. 11, 2014.

(30) Foreign Application Priority Data

Apr. 12, 2013 (DE) .................. 10 2013 006 751

(51) Int. Cl.
  *F16F 15/173* (2006.01)
(52) U.S. Cl.
  CPC .................. *F16F 15/173* (2013.01)
(58) Field of Classification Search
  CPC ................. F16F 15/173; Y10T 74/2125
  USPC ........... 188/290, 322.5, 378, 379; 74/573.12, 74/574
  See application file for complete search history.

(56) References Cited

U.S. PATENT DOCUMENTS

| | | | |
|---|---|---|---|
| 2,824,467 A | | 2/1958 | O'Connor |
| 3,398,602 A | | 8/1968 | Croset |
| 3,448,830 A | * | 6/1969 | Desmond .............. F16F 15/173 188/322.5 |
| 3,640,149 A | * | 2/1972 | McLean ................ F16F 15/173 188/322.5 |
| 3,716,901 A | * | 2/1973 | Bragg .................. B05C 19/025 29/436 |
| 4,172,510 A | | 10/1979 | Forkel |

(Continued)

FOREIGN PATENT DOCUMENTS

| | | |
|---|---|---|
| CN | 102168736 A | 8/2011 |
| DE | 26 40 752 A1 | 4/1978 |

(Continued)

OTHER PUBLICATIONS

Chinese Office Action issued in counterpart Chinese Application No. 201480020806.5 dated May 27, 2016 with partial English translation (seven pages).

(Continued)

*Primary Examiner* — Robert A. Siconolfi
(74) *Attorney, Agent, or Firm* — Crowell & Moring LLP

(57) ABSTRACT

A rotary viscous vibration damper or absorber has a hub part which can be fastened to a crankshaft of an engine, in particular of an internal combustion engine, and a vibration damper ring which is mounted such that it can be rotated relative to the hub part. A shear gap which is filled with a silicone oil is formed between the hub part and the vibration damper ring, in which shear gap flange bushings for guiding the vibration damper ring are mounted. The flange bushings are composed of a liquid crystal polymer.

4 Claims, 3 Drawing Sheets

(56) References Cited

U.S. PATENT DOCUMENTS

| | | | | |
|---|---|---|---|---|
| 5,058,453 | A | * | 10/1991 | Graham ................ F16F 15/173 188/379 |
| 5,425,287 | A | * | 6/1995 | Beattie ................ F16F 15/1442 464/180 |
| 5,686,176 | A | | 11/1997 | Adam et al. |
| 5,749,269 | A | * | 5/1998 | Szymanski ............. F16F 15/14 74/573.12 |
| 5,862,897 | A | * | 1/1999 | Allport ................ F16F 15/173 188/378 |
| 5,979,390 | A | * | 11/1999 | Depp ........................ F01L 1/02 123/192.1 |
| 6,161,450 | A | * | 12/2000 | Sandig ................. B29C 70/742 264/328.1 |
| 6,993,996 | B2 | * | 2/2006 | Herrmann ............. F16F 15/173 74/574.3 |
| 8,627,931 | B2 | * | 1/2014 | Geislinger ............ F16F 15/173 188/290 |
| 2003/0112735 | A1 | * | 6/2003 | Itakura .................... F16F 13/10 720/694 |

FOREIGN PATENT DOCUMENTS

| | | |
|---|---|---|
| DE | 44 30 474 C1 | 3/1996 |
| DE | 10 2006 048 311 A1 | 4/2008 |
| EP | 0 745 784 A1 | 12/1996 |
| EP | 0 745 784 B1 | 5/2000 |
| EP | 2 069 651 B1 | 5/2015 |

OTHER PUBLICATIONS

International Search Report (PCT/ISA/210) issued in counterpart International Application No. PCT/EP2014/057437 dated Jul. 24, 2014, with English translation (Four (4) pages).

German Office Action issued in counterpart German Application No. 10 2013 006 751.0 dated Feb. 12, 2014 (Six (6) pages).

International Preliminary Report on Patentability (PCT/IB/326 & PCT/IB/373) issued in PCT Application No. PCT/EP2014/057437 dated Oct. 13, 2015, including English translation of document Written Opinion (PCT/ISA/237) (seven (7) pages).

* cited by examiner

ROTARY VISCOUS VIBRATION DAMPER OR ROTARY VISCOUS VIBRATION ABSORBER

CROSS REFERENCE TO RELATED APPLICATIONS

This application is a continuation of PCT International Application No. PCT/EP2014/057437, filed Apr. 11, 2014, which claims priority under 35 U.S.C. § 119 from German Patent Application No. 10 2013 006 751.0, filed Apr. 12, 2013, the entire disclosures of which are herein expressly incorporated by reference.

BACKGROUND AND SUMMARY OF THE INVENTION

The present invention relates to a rotary viscous vibration damper or a rotary viscous vibration absorber.

Rotary viscous vibration dampers or rotary viscous vibration absorbers are known per se. Dampers or absorbers of this type are used to reduce rotary vibrations on crankshafts of reciprocating piston engines. Vibration damper rings or vibration damper masses are mounted within the housing of dampers or absorbers of this type. Here, the housing usually has a hub part which can be fastened to a crankshaft of an engine, in particular of an internal combustion engine. It is possible for the vibration damper ring to be rotated relative to the hub part. A shear gap, which is filled with a liquid shearing medium such as the abovementioned silicone oil, is formed between the hub part and the vibration damper ring. Flange bushings serve to guide and mount the vibration damper ring in the shear gap which is filled with silicone oil.

The flange bushings are usually inserted without prestress between the two damper housings and the vibration damper ring in order to allow the housing and the ring to slide on the flange bushings with as little friction as possible.

It is problematic at high temperatures, in particular at temperatures above 130° C. which regularly arise in rotary vibration dampers during driving operation on account of the shearing of the damping medium of silicone oil, that interactions frequently occur between the conventional flange bushings (which are, as a rule, manufactured from polyamide) and the silicone oil. These interactions lead to very rapidly progressing degeneration of the viscosity of the silicone oil. For instance, a decrease in the viscosity by 53% after a period of approximately 20 hours has been determined in tests at a rotary viscous vibration damper external temperature of 160° C. The service life of rotary viscous vibration dampers of this type is, as a rule, 20,000 hours. Here, wear of only 30% is aimed for in this time period.

In order to solve this problem, an attempt might first be made to reduce the high operating temperature, which does not appear probable, however, on account of installation space restrictions and relatively high peak pressures of the engines, with the result that the rotary viscous vibration dampers tend to have to be designed for withstanding even higher temperatures. Therefore, it also does not appear appropriate to design the rotary viscous vibration dampers in such a way that they are not subjected to high temperatures of this type during operation.

It is therefore an object of the present invention to provide a rotary viscous vibration damper or a rotary viscous vibration absorber which, even at temperatures above 130° C., ensures a longer service life than conventional rotary viscous vibration dampers or absorbers.

This and other objects are achieved according to the invention by a rotary viscous vibration damper or a rotary viscous vibration absorber having a hub part which can be fastened to a crankshaft of an engine, in particular of an internal combustion engine, and a vibration damper ring which is mounted such that it can be rotated relative to the hub part. A shear gap, which is filled with a silicone oil, is configured between the hub part and the vibration damper ring, in which shear gap flange bushings for guiding the vibration damper ring are mounted. The flange bushings are made of a liquid crystal polymer.

The rotary viscous vibration damper or absorber according to the invention is distinguished by the fact that the flange bushings consist of a liquid crystal polymer (LCP). It has been shown that this material does not interact, or interacts merely to a negligible extent, with the silicone oil even at relatively high temperatures, in particular above 130° C.

The use of flange bushings according to the invention of this type in a rotary viscous vibration damper or absorber makes a longer service life of the rotary viscous vibration damper or absorber possible in comparison with conventional rotary viscous vibration dampers or absorbers with flange bushings which consist, for example, of polyamide.

A further advantage of the rotary viscous vibration damper or absorber according to the invention consists in that, on account of the reduced heat sensitivity of the flange bushing material with regard to the interaction with the silicone oil, higher vibration damper temperatures can be permitted in comparison with the working temperatures of conventional rotary viscous vibration dampers or absorbers. As a result, a reduction in installation space and/or savings of material, in particular as a result of the omission of the fan disks or at least smaller dimensioning of the fan disks, is made possible. All of the abovementioned measures serve to reduce the vibration damper temperature, in order to reduce the degeneration of the viscosity of the silicone oil as a result of interaction with the material of the flange bushings.

Other objects, advantages and novel features of the present invention will become apparent from the following detailed description of one or more preferred embodiments when considered in conjunction with the accompanying drawings.

DETAILED DESCRIPTION OF THE DRAWINGS

In the following description of the figures, expressions such as top, bottom, left, right, front, rear, etc. relate exclusively to the exemplary illustration and position of the rotary viscous vibration dampers, flange bushing, vibration damper ring and the like selected in the respective figures. Said expressions are not to be understood to be restrictive, that is to say said references can change as a result of different working positions or the mirror-symmetrical design or the like.

Figure 1:
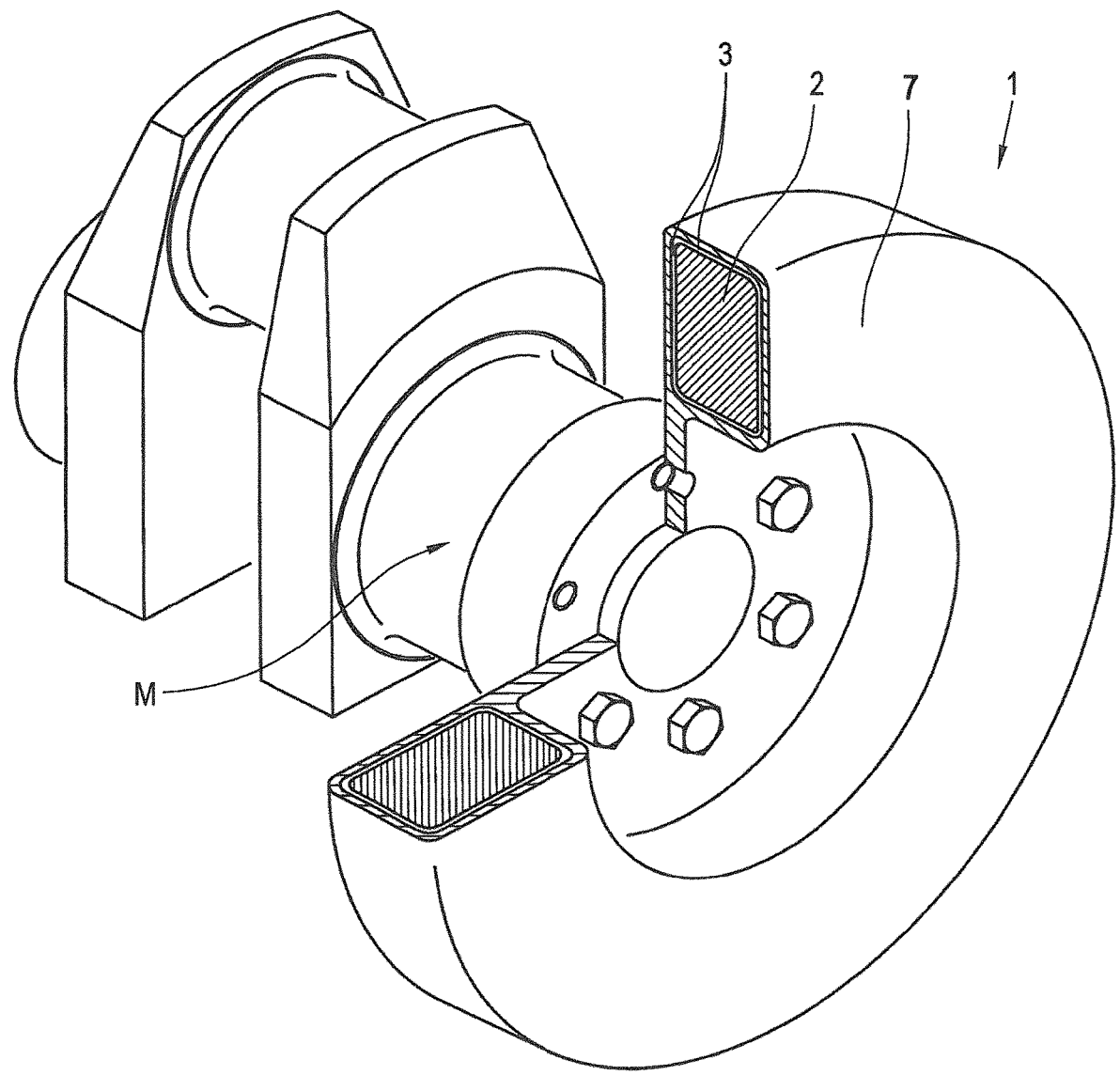
FIG. 1 is a perspective partial sectional view of a rotary viscous vibration damper or rotary viscous vibration absorber according to an embodiment of the invention.

In FIG. 1, one design variant of a rotary viscous vibration damper or rotary viscous vibration absorber according to the invention is denoted overall by the designation 1. Here, the rotary viscous vibration damper or absorber has substantially an annular housing 7 which is connected fixedly to the crankshaft M of an engine so as to rotate with it. A vibration damper ring 2 is connected within the housing 7. The vibration damper ring 2 is surrounded by a silicone oil which serves as damping medium and fills a shear gap 3 between the housing 7 and the vibration damper ring 2.

Figure 2:
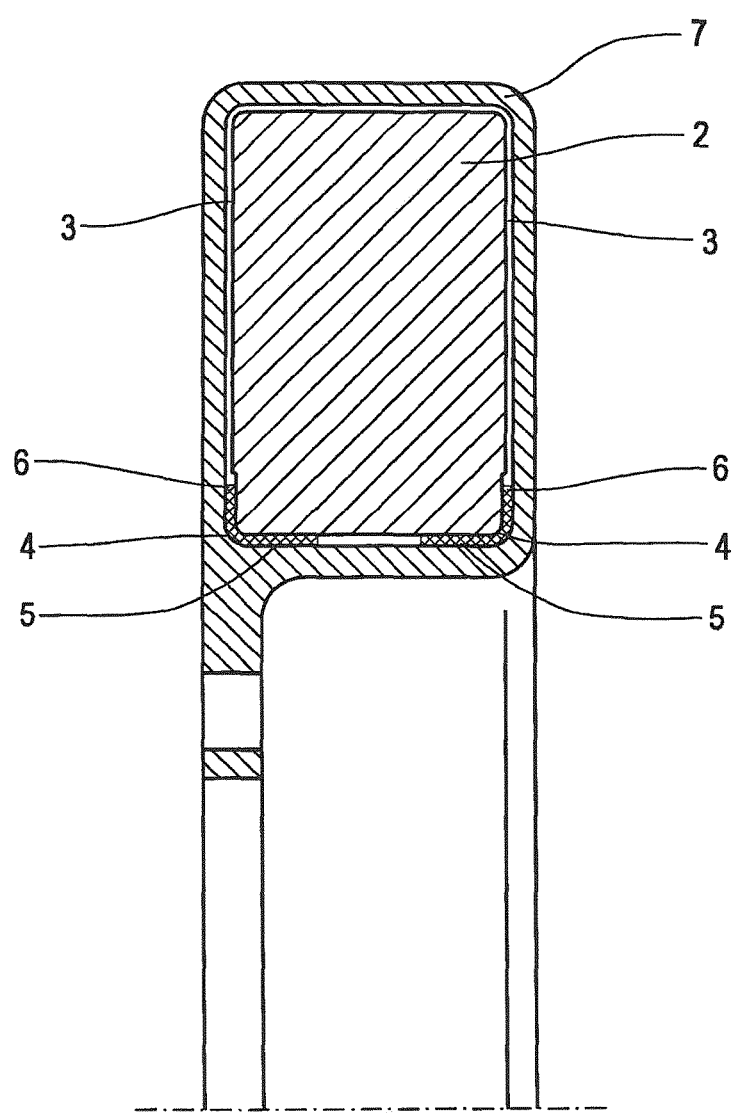
FIG. 2 is a cross-sectional view of the rotary viscous vibration damper or rotary viscous vibration absorber from FIG. 1.
Figure 3:
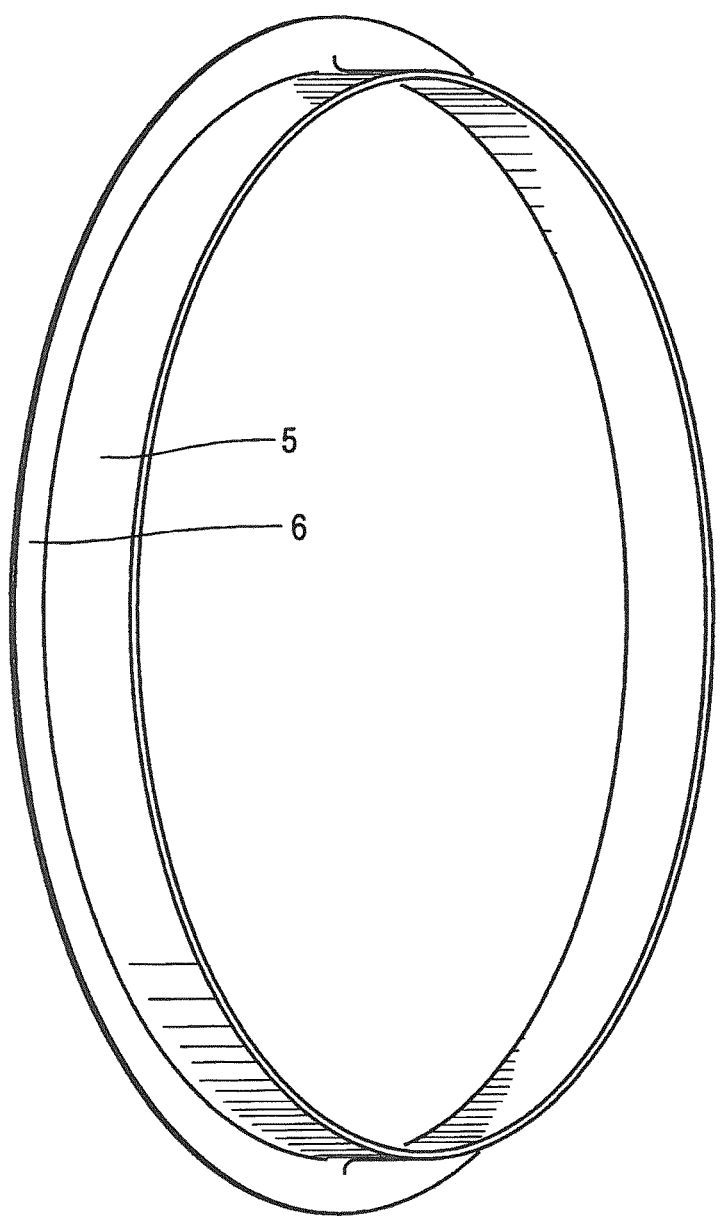
FIG. 3 is a perspective view of one design variant of a flange bushing.

As can be seen clearly in FIG. 2, the vibration damper ring 2 which is mounted loosely in the housing 7 is guided radially and axially in the housing by way of flange bushings 4. The flange bushings 4 have a preferably L-shaped cross section with an axial bearing part 5 and a radial bearing part 6. Here, the flange bushings 4 lie in a shear gap 3 between the vibration damper ring 2 and the housing 7. The shear gap 3 is filled with silicone oil.

In order to avoid damage as far as possible, in particular a reduction in the viscosity of the silicone oil as a result of interactions with the material from which the flange bushings are manufactured, the flange bushings are produced from a liquid crystal polymer. By way of flange bushings 4 of this type produced from a liquid crystal polymer, a mere reduction in the decrease in viscosity of the silicone oil of only 3.8% occurs after 20 hours of action at 160° C. This brings about a considerable extension of the service life in comparison with a decrease in viscosity of the silicone oil of 53% if flange bushings manufactured from polyamide are used. Such flange bushings interact greatly with the silicone oil, in particular at temperatures above 130° C.

The use of flange bushings of this type, which are produced from liquid crystal polymers, makes it possible to save materials, such as fan disks. Those fan disks were used to bring about cooling of the silicone oil that heats up during operation in the case of conventional rotary viscous vibration dampers or absorbers in order to limit as much damage as possible to the silicone oil with the flange bushings manufactured from polyamide in the prior art.

List of Designations
1 Rotary viscous vibration damper or rotary viscous vibration absorber
2 Vibration damper ring
3 Shear gap
4 Flange bushing
7 Housing
M Crankshaft The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotary viscous vibration damper or absorber, comprising:
    a hub part fastenable to a crankshaft of an engine;
    a vibration damper ring mounted so as to be rotated relative to the hub part;
    a shear gap configured between the hub part and the vibration damper ring, the shear gap being filled with a silicone oil;
    flange bushings mounted in the shear gap, the flange bushings guiding the vibration damper ring in the hub part, wherein the flange bushings are made of a liquid crystal polymer.

2. The rotary viscous vibration damper or absorber according to claim 1, wherein the flange bushings have an L-shaped cross section.

3. The rotary viscous vibration damper or absorber according to claim 2, wherein the hub part is a substantially annular housing in which the vibration damper ring is guided radially and axially via the flange bushings.

4. The rotary viscous vibration damper or absorber according to claim 3, wherein the engine is an internal combustion engine.

* * * * *